US007930329B2

(12) United States Patent
Lee et al.

(10) Patent No.: US 7,930,329 B2
(45) Date of Patent: Apr. 19, 2011

(54) SYSTEM, METHOD AND MEDIUM BROWSING MEDIA CONTENT USING META DATA

(75) Inventors: Kwang-hyeon Lee, Yongin-si (KR);
Chang-kyu Choi, Yongin-si (KR);
Sung-jung Cho, Yongin-si (KR);
Dong-geon Kong, Yongin-si (KR);
Yeun-bae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 300 days.

(21) Appl. No.: 11/710,994

(22) Filed: Feb. 27, 2007

(65) Prior Publication Data
US 2007/0255747 A1    Nov. 1, 2007

(30) Foreign Application Priority Data

Apr. 27, 2006    (KR) .................. 10-2006-0038200

(51) Int. Cl.
*G06F 12/00*    (2006.01)
*G06F 15/16*    (2006.01)
*G06F 17/30*    (2006.01)
*G06F 3/00*    (2006.01)
(52) U.S. Cl. ........................... 707/899; 715/704
(58) Field of Classification Search .................. None
See application file for complete search history.

(56) References Cited

U.S. PATENT DOCUMENTS

| 6,446,083 B1 | 9/2002 | Leight et al. |
| 6,760,721 B1 | 7/2004 | Chasen et al. |
| 6,771,290 B1 * | 8/2004 | Hoyle ........................ 715/745 |
| 7,181,468 B2 * | 2/2007 | Spring et al. ............... 707/104.1 |
| 2002/0073108 A1 | 6/2002 | Morita et al. |
| 2002/0091835 A1 * | 7/2002 | Lentini et al. ................ 709/227 |
| 2002/0107973 A1 * | 8/2002 | Lennon et al. ................ 709/231 |
| 2002/0147728 A1 | 10/2002 | Goodman et al. |
| 2003/0093432 A1 | 5/2003 | Fujita et al. |
| 2003/0101104 A1 | 5/2003 | Dimitrova et al. |
| 2008/0184143 A1 * | 7/2008 | Gottlieb et al. ............... 715/764 |

FOREIGN PATENT DOCUMENTS

| KR | 10-2005-0085317 | 8/2005 |
| WO | WO2005/027519 | 3/2005 |

OTHER PUBLICATIONS

PCT Notification of Transmittal of the International Search Report and the Written Opinion of the International Searching Authority, or the Declaration for corresponding PCT International Application No. PCT/KR2007/001469 dated Mar. 27, 2007 (in English).
European Search Report for corresponding European Patent Application No. 07745641.5 dated Nov. 18, 2010, 8 pgs. (in English).

* cited by examiner

*Primary Examiner* — Etienne P LeRoux
*Assistant Examiner* — Susan Y Chen
(74) *Attorney, Agent, or Firm* — Staas & Halsey LLP

(57) ABSTRACT

A system, method and medium for browsing media content using meta data, in which media content stored in the system is efficiently browsed using meta data of media content currently in use and media content related meta data. The system includes a media reproducing unit to reproduce media content having corresponding meta data, a root category generating unit to generate at least one root category from meta data corresponding to the media content currently in use, and a sub-category generating unit to generate at least one sub-category of a root category selected by a user from among the at least one root category, based on the meta data.

22 Claims, 8 Drawing Sheets

US 7,930,329 B2

SYSTEM, METHOD AND MEDIUM BROWSING MEDIA CONTENT USING META DATA

CROSS-REFERENCE TO RELATED APPLICATIONS

This application claims priority from Korean Patent Application No. 10-2006-0038200 filed on Apr. 27, 2006 in the Korean Intellectual Property Office, the disclosure of which is incorporated herein by reference in its entirety.

BACKGROUND

1. Field

One or more embodiments of the present invention relate to a system, method and medium for browsing media content using meta data, and more particularly to a system, method and medium for browsing media content using meta data, in which media content stored in the system is efficiently browsed using the meta data of media content currently in use.

2. Description of Related Art

Recently, as the mass storage capacity of portable digital devices has increased, the devices have begun to hold an immense quantity of multimedia content. Examples of such a portable digital device include a mass capacity storage device such as a flash memory, and a hard disk. Moreover, with the trend in miniaturization of portable digital device, the devices have become smaller and now include MP3 players, portable multimedia players (PMP), and digital video recorders for home use. Moreover, the amount of data that can be stored on a portable digital device has increased even further due to advancements in compression technique for media content storage. Thus, a portable MP3 player or a PMP may now allow tens of thousands of music files to be stored therein, but the devices still have considerable difficulty in allowing a user to browse desired music or media content quickly and easily.

A conventional technique for of browsing media content will now be described.

Generally, media content is input to the system along with basic meta data. Meta data is generally understood to be data describing the underlying media data. The basic meta data input may include media content related data such as an ID3 tag or Exif tag. Here, the ID3 tag typically used for a digital audio file may include the file name, file size, file update date, and basic data regarding the MP3 audio file, such as the title, composer, singer, and genre of the song.

Conventionally, a user browses meta data of media content by inputting a title or artist name as text, reviewing a list of title or artist names arranged in alphabetical order, or uttering the title or the singer name as audio signals. Sometimes, the user generates a folder or a play list if necessary to reproduce media content stored in the system.

A user may also browse media content by classifying meta data of the media content in accordance with a certain mode. For example, music files have been classified into singers and albums based on meta data, and in this case, the artists' names are listed in alphabetical order or album titles are listed alphabetically.

FIG. 1 illustrates a conventional system for browsing media content.

Generally, media content is stored in a multimedia device such as an MP3 player along with meta data 102 corresponding to the media content. The user may browse media content using a search engine 104. The search engine 104 can search for desired content using the meta data, without having to browse all of the media content itself.

For example, if the media content to be searched is music, the user may generally look for a desired song by inputting a song title, composer, artist or lyrics. In FIG. 1, the result 106 output to an output unit is shown if a title of a song (for example, love) is searched for. The user can listen to a desired music by selecting the music from an output list.

Such a conventional classification system can easily be used if the quantity of files is small. However, if there are several thousand files or more, it is difficult for the user to select the desired content. Moreover, since most portable or home-use media devices use simple techniques for data input such as a single button or a remote control, and not a key board or a mouse, it is difficult for the user to select the desired content. In addition, the user needs to know details about the desired media content such as the song title, composer or artist, posing a problem if the user lacks knowledge of such details.

Furthermore, the user tends to listen to or view content that is related to media content currently in use. For example, the user may wish to know who sings a song currently being played or may wish to listen to another song by the artist. Further, the user may wish to listen to either another song by the composer of the song being listened to, or to other music that was popular at the same time as the current song. Accordingly, although the user tends to effectively browse media content related to current media content, conventional techniques fail to provide such effective browsing.

SUMMARY

An aspect of the present invention provides a system, method and medium for browsing media content using meta data, in which media content system is efficiently browsed using meta data of media content currently in use.

Additional aspects and/or advantages of the invention will be set forth in part in the description which follows and, in part, will be apparent from the description, or may be learned by practice of the invention.

To achieve at least the above and/or other aspects and advantage, embodiments of the present invention include a system for browsing media content using meta data. The system includes a media reproducing unit to reproduce media content having corresponding meta data, a root category generating unit to generate at least one root category from meta data corresponding to the media content currently in use, and a sub-category generating unit to generate at least one sub-category of a root category selected by a user from among the at least one root category, based on the meta data.

To achieve at least the above and/or other aspects and advantage, embodiments of the present invention include a dynamic category display device using meta data of media content. The device includes a category generating unit to generate categories, based on the meta data of the media content, and an output unit to display the generated categories as GUI images based on categories selected by a user, or media content currently in use, the GUI images of a category being emphasized in the display to indicate that a large quantity of media content is included in the category, or to indicate that the category has been browsed frequently by the user.

To achieve at least the above and/or other aspects and advantage, embodiments of the present invention include a method of browsing media content using meta data. The method includes reproducing media content having corresponding meta data, generating at least one root category based on the meta data corresponding to the media content currently in use, and generating at least one sub-category of a root category selected by a user among the at least one root category, based on the meta data.

To achieve at least the above and/or other aspects and advantage, embodiments of the present invention include a method of browsing media content in accordance with a user's definition. The method includes selecting a list of meta data to browse media content based on respective meta data included with the media content, designating a priority order for the selected list of meta data, and browsing media content in accordance with the designated priority order.

To achieve at least the above and/or other aspects and advantage, embodiments of the present invention include a method of successively browsing media content using meta data including storing a user selectable browsing method of the media content using the meta data, and browsing subsequent media content in accordance with the stored browsing method after the media content currently in use has ended.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
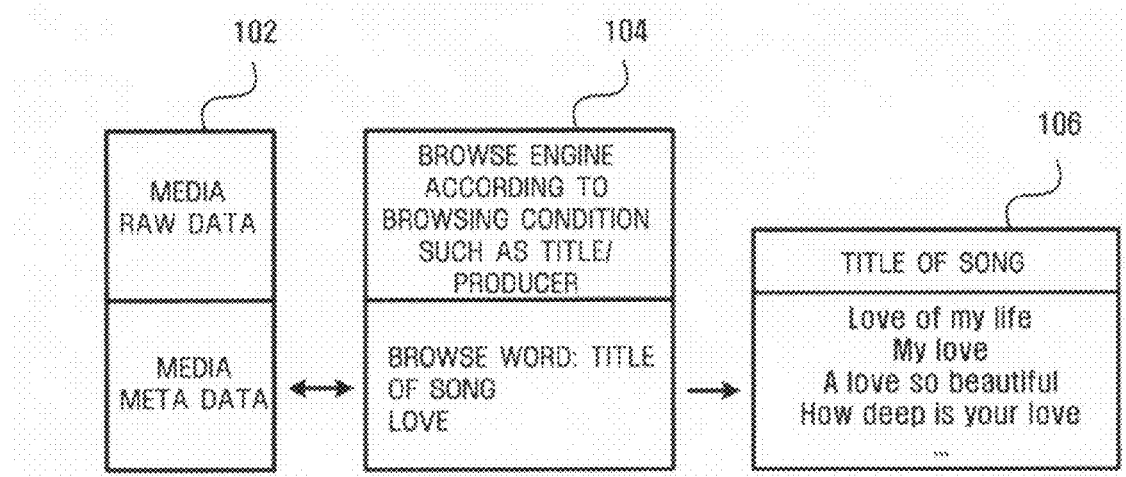
FIG. 1 illustrates a conventional apparatus for browsing media content.

Reference will now be made in detail to one or more embodiments of the present invention, examples of which are illustrated in the accompanying drawings, wherein like reference numerals refer to the like elements throughout. One or more embodiments are described below to explain the present invention by referring to the figures.

Figure 2:
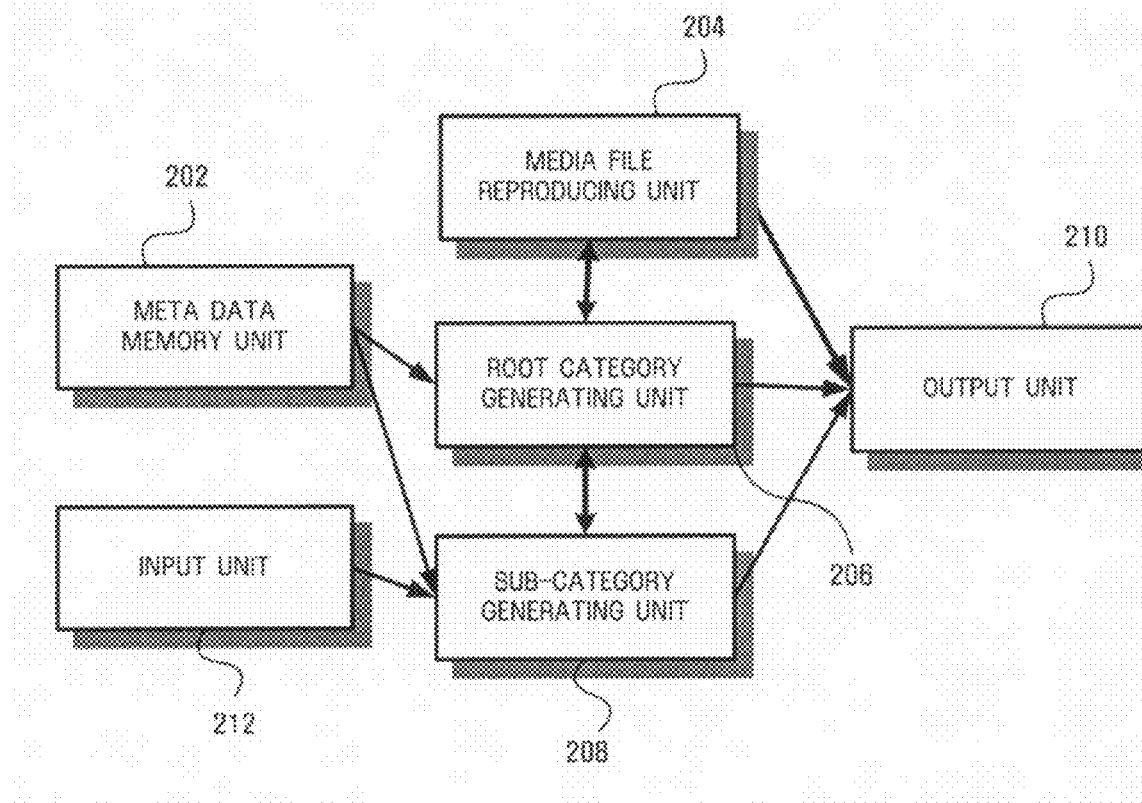
FIG. 2 illustrates a system for browsing media content using meta data according to an embodiment of the present invention.
Figure 3:
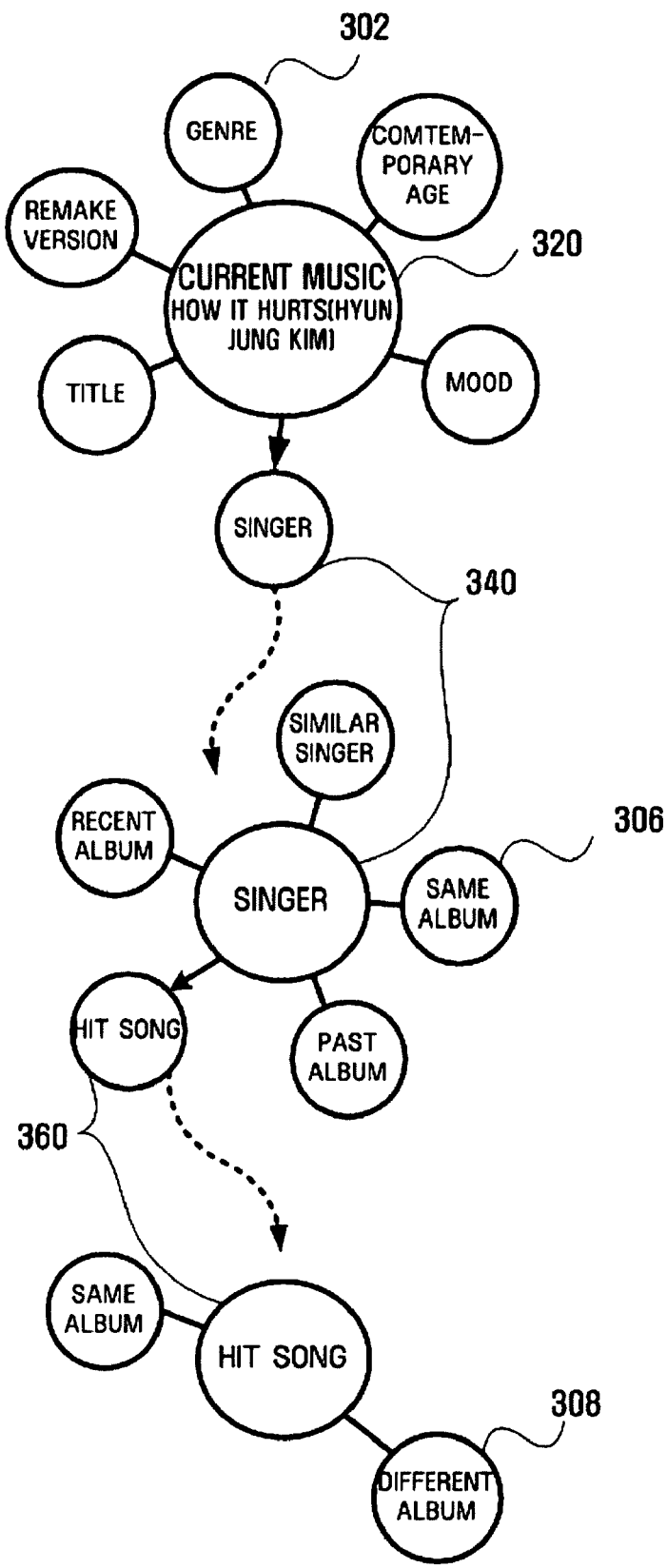
FIG. 3 illustrates a mechanism for generating a category in a system for browsing media content using meta data according to an embodiment of the present invention.

FIG. 2 illustrates the construction of a system for browsing media content using meta data according to an embodiment of the present invention, and FIG. 3 illustrates a mechanism that generates a category in a system for browsing media content using meta data according to an embodiment of the present invention.

The system shown in FIG. 2 may include a meta data memory unit 202, a media file reproducing unit 204, a root category generating unit 206, a sub-category generating unit 208, an output unit 210, and an input unit 212, for example.

The media file reproducing unit 204 serves to reproduce media having various data corresponding to media content. For example, the media file reproducing unit 204 may include a reproducing unit that reproduces media content from a compact disk (CD) player, an MP3 player, a mini disk (MD) player, a PMP, and a built-in type MP3 player of a cellular phone, and a reproducing unit that reproduces media content from a media reproducing program realized in software through a computer. In an embodiment, the media file reproducing unit 204 may also include a reproducing unit provided with mass capacity medium to reproduce media content.

Generally, media content refers to moving pictures, images, text, voice, music and sound for commercial use, provision of information, or advertisement. In one or more embodiments of the present invention, media content may include elements such as moving pictures or music corresponding to media content.

The meta data memory unit 202 may serve to store meta data of media content files. Meta data refers to data given in accordance with a certain rule for effective browsing and may include unique media information and user's' ranking and use information, for example, a popularity ranking. Accordingly, the media content can be classified according to the meta data, and this classification facilitates browsing or retrieval. In this respect, in an embodiment, the meta data memory unit 202 may include memory that stores meta data to effectively browse the user's desired media content according to one or more embodiments of the present invention. Generally, the memory unit can, for example, refer to a storage space that stores data electromagnetically to allow a corresponding device to access the data stored therein. The memory unit 202 may include, in this example, RAM, a hard disk, a tape, and similar devices for storing the data of internal and external devices. In one or more embodiments of the present invention, the meta data memory unit 202 may store, or have access thereto, the meta data, and read the meta data of the media content from its memory so that the meta data can be used to generate a dynamic category required to browse the user's desired media content, for example.

The root category generating unit 206 may serve to generate root categories using the meta data of the media content currently in use, for example. The media content currently in use can be provided with raw data and its related meta data. The meta data may be input to the system along with the media content. Some systems may download the meta data through a wired or wireless network when the media content is input thereto. Since the meta data is provided in accordance with a certain rule for effective browsing, the media content can be classified for the meta data. Accordingly, meta data that is highly related to media content currently in use or having a large quantity of content, or categories corresponding to an upper level of users' browsing preference can be selected. In this way, the root category generating unit 206 generates the root categories using the meta data of the media content currently in use. The user may select one of the generated categories to selectively extract content within the selected root category related to the media content currently in use. Thus, if another media content related to the media content currently in use is browsed, the root category is generated through the meta data of the corresponding media content.

As an example, suppose that the media content currently in use is a song titled "how it hurts" 320, by an artist, Hyunjung KIM, as shown in FIG. 3. In this case, the user may have no information regarding the song "how it hurts." The root category generating unit may generate at least one root category 302 related to the corresponding music by browsing meta data of the music currently in use. The classification corresponding to the root category 302 is not always equally settled by types of content, e.g. music, but may randomly be selected either according to the importance of the meta data of the corresponding content, or according to the correlation of the meta data with the corresponding content, or from a list of meta data. For example, as shown in FIG. 3, genre, title, mood, remake version, singer, and contemporary age may be selected as the root category 302 of the current music, for example. The root category 302 may be determined according to the meta data of the current music. It should be noted that the categories described such as genre, title, mood, and remake version are provided as examples only and that any category may be used instead of, or in addition to, those listed.

If the user selects any one or more root categories after the root categories are generated, the sub-category generating unit 208 may serve to generate a new sub-category on the basis of the selected root category, for example. The sub-category generating unit 208 has the same mechanism as that of the root category generating unit 206, which generates the category using the meta data of the media content currently in use. However, the sub-category generating unit 208 may require that the user select the root category using an input technique to generate the sub-category. In other words, after the user selects the root category, the sub-category generating unit 208 may generate the sub-category through the meta data of the media content currently in use on the basis of the selected root category. Generally, because the sub-category is within the root category of the current song, it is preferably generated considering the root category. For example, suppose that the media content is music. In this case, if "genre" is selected as the root category, the same genre as that of the current song, a different genre, and other genres (e.g., ballad, rock, metal, blues, new age, and hip-hop) may be the sub-category, for example. If "singer" is selected as the root category, the sub-categories might include other songs by the singer, other songs on the current album, other albums by the same singer, the latest songs by the same singer, recent album by the same singer, music by similar singers, and popular music by the same singer, for example. In other words, after the root category is selected, the sub-category of the selected root category may be generated referring to the meta data of the media content currently in use. The listed examples of the sub-category should be unique meta data included in media content of the user's system and external meta data such as external ranking data. In an embodiment, meta data of the media content not included in the user's system should not be used as the category.

For example, suppose that the user selects a root category such as "singer" after various categories are generated as root categories corresponding to the current song "how it hurts," as shown in FIG. 3. If the category "singer" 340 is selected, the sub-category generating unit 208 browses meta data corresponding to common parts between the current song and the singer to generate a sub-category 306 having high degree of correlation. In other words, the sub-category 306, such as a recent album of the singer corresponding to the current song, the same album as that of the current song, a past album of the singer corresponding to the current song, a hit song of the singer corresponding to the current song, and other singers having a similar style to the singer corresponding to the current song, may be generated, as examples. The generated category may be determined by the meta data corresponding to the media content file. Even though the meta data corresponds to the same type of music file, the same category is not generated.

If the user selects the sub-category "hit song" 360 after selecting "singer" 340, the current song is within the hit song of the corresponding singer. Accordingly, a sub-sub-category 308 is again generated by the meta data of the current song within the range including the current song, singer, and hit song.

If the user who is listening to the song "how it hurts" desires to listen to another song by the same singer, the user can easily access hit songs by the singer of the current song, using meta data of the current song. The user need not know the name of the singer or the title of the corresponding song. The user can browse the sub-sub-category 308, for example, another song included in the same album or other albums among hit songs of the singer of the current song, as shown in FIG. 3, to select a desired song from the list of the hit songs, or more specifically to browse it. Thus, the user can browse media content by generating first to N-th sub-categories in accordance with one or more embodiments of the present invention. Generally, the dynamic category is generated using meta data of media content. To this end, meta data of corresponding media content may be established in a data base. In other words, basic meta data based on basic data such as tag data of media content, classification related information meta data, and related community information meta data can construct a data base field or a table, wherein the classification related information data and the related community information meta data may be used as additional meta data.

Again as shown in FIG. 2, the output unit 210 may display a list of media files, categories, or media content, for example. The output unit 210 may include various displays, such as a cathode ray tube (CRT), a liquid crystal display (LCD), a plasma display panel (PDP), an organic light emitting diode (OLED), an electro chromic display, and a display unit generating and/or visually outputting data for information transmission to a user on a screen. The output unit 210 may display information of media content. In one or more embodiments of the present invention, the output unit 210 may display a list of media content included in the categories generated in browsing the media content. Also, music files may be executed even though there is no output unit. In this case, if the user selects a certain category, music highly related to the category may first be executed or may be randomly selected from the list within the range of the selected category. However, for music files, the user can easily select the music listed on the output unit if the list of the music related to the selected category is listed on the output unit 210. Accordingly, the output unit may be provided for the user's convenience.

Furthermore, the output unit 210 may output the structure of the categories output by the category generating units 206 and 208 through a graphic user interface (GUI) image, which will be described later in more detail.

Again as shown in FIG. 2, the input unit 212 may serve to input the selected category from the system for browsing media content. For example, in the case of an MP3 player and a PMP, a selection key, a direction key, and/or a touch pad may be used as the input unit, for example. In the case of PDA, a touch pad, a number key, and/or a text key may be used as the input unit, for example. In the case of a computer, a key board, a mouse, and/or a touch pad may be used as the input unit, for example. In addition, the input unit 212 may input the selected category using the user's voice through speech recognition or using the user's motion through motion recognition.

As shown in FIG. 2, at least one or more root categories may be generated by the root category generating unit 206. If the user selects any one of the root categories, it can designate a category selected by the input unit 212 or select one of menus listed on the output unit 210, i.e., one category through the input unit 212. Further, the user may select any one or more sub-categories generated by the sub-category generating unit 208 through the input unit 212. Moreover, the user may execute desired media content or add the media content to a play list through the input unit 212, for example.

Figure 4:
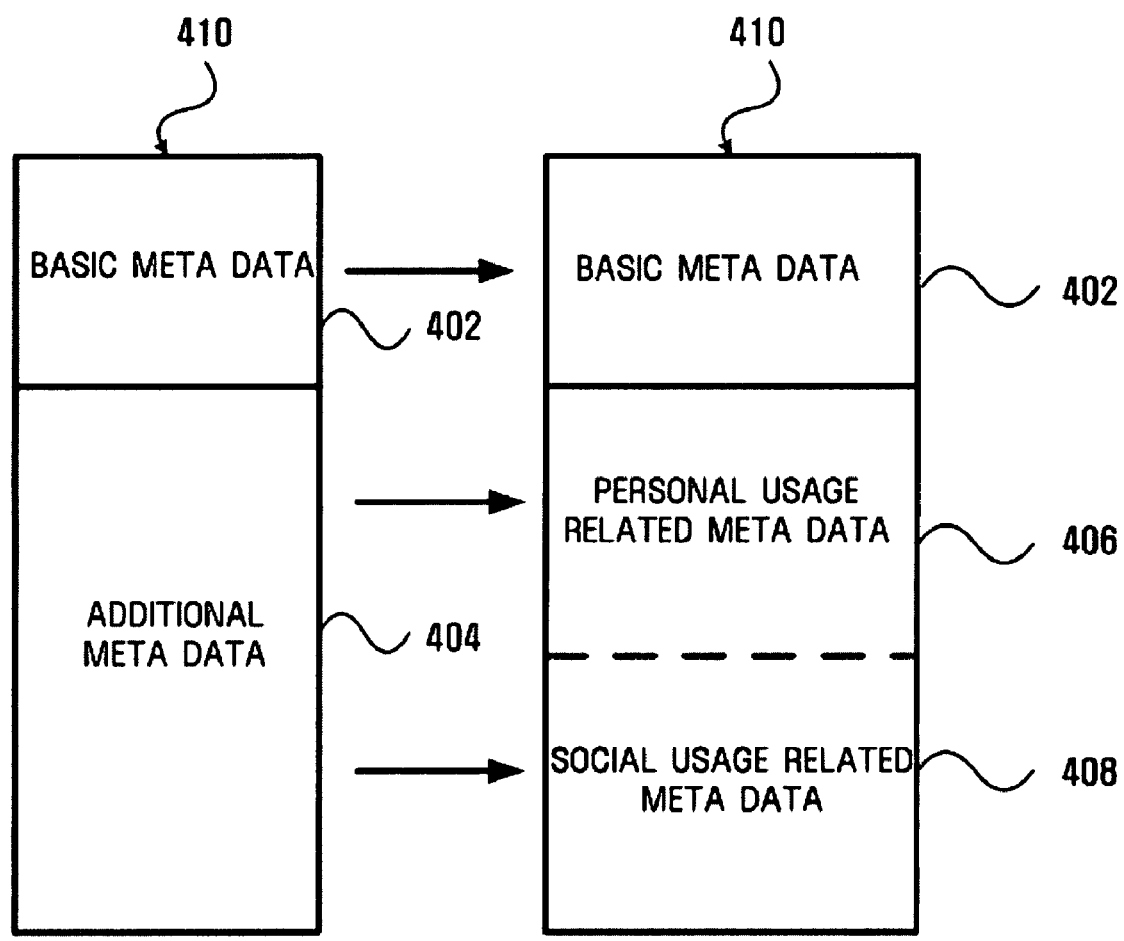
FIG. 4 illustrates structured meta data of media content according to an embodiment of the present invention.

FIG. 4 illustrates structured meta data of media content according to an embodiment of the present invention.

Meta data 410 given for effective browsing of content among a large quantity of media content, as shown in FIG. 4, may be classified into basic meta data 402 and additional meta data 404.

The basic meta data 402 refers to basic data for the media content. For example, in the case of a music file, basic data 402 may include a title of a song, file size, length of a song, singer, composer, producer, and album title. The basic meta data 402 is already defined when the media content is produced. The same types of media content generally have the same types of basic meta data 402.

The additional meta data 404 includes personal usage related meta data 406 and social usage related meta data 408 about media content. Generally, the media content related information includes meta data used for classification of media content in addition to basic information of content. The social usage related meta data 408 refers to that community information of media content is stored as meta data. For example, the community information of media content may be determined from a sales ranking or a popularity ranking for a certain time period after the media content is known to the public through public media, or may be stored in a personal play list, for example.

If the media content corresponds to music, the additional meta data 404 may include music related information and music related community information. Examples of the music related community information include information used for classification of music, such as genre, mood, album type, title, and release year, in addition to basic information about the music. The music related community information refers to external information, and may include, as examples, a hit song, popular song, popularity ranking, hit year, popular year, the number of download times, recent execution date, the number of execution times, similar singers, and a personal play list.

The media content may be changed even after they are provided to the user, and the community information of the media content may be added as time passes. Accordingly, in an embodiment, the meta data 410 should be continuously updated. In most cases, the basic meta data 402 is equal to the original basic meta data 402. However, the basic meta data 402 may be required to be updated to correct a wrong marking. The additional meta data 404, especially the social usage related meta data 408, may be updated due to a change in the popularity of a song, or frequent changes in personal play lists. Accordingly, changed data of the meta data may be continuously updated using wired or wireless networks, for example. In addition, the user may use the meta data or update the changed meta data by accessing a wired or wireless network when the user desires to browse media content, even though there are no meta data in the media content reproducing system currently in use.

Figure 5:
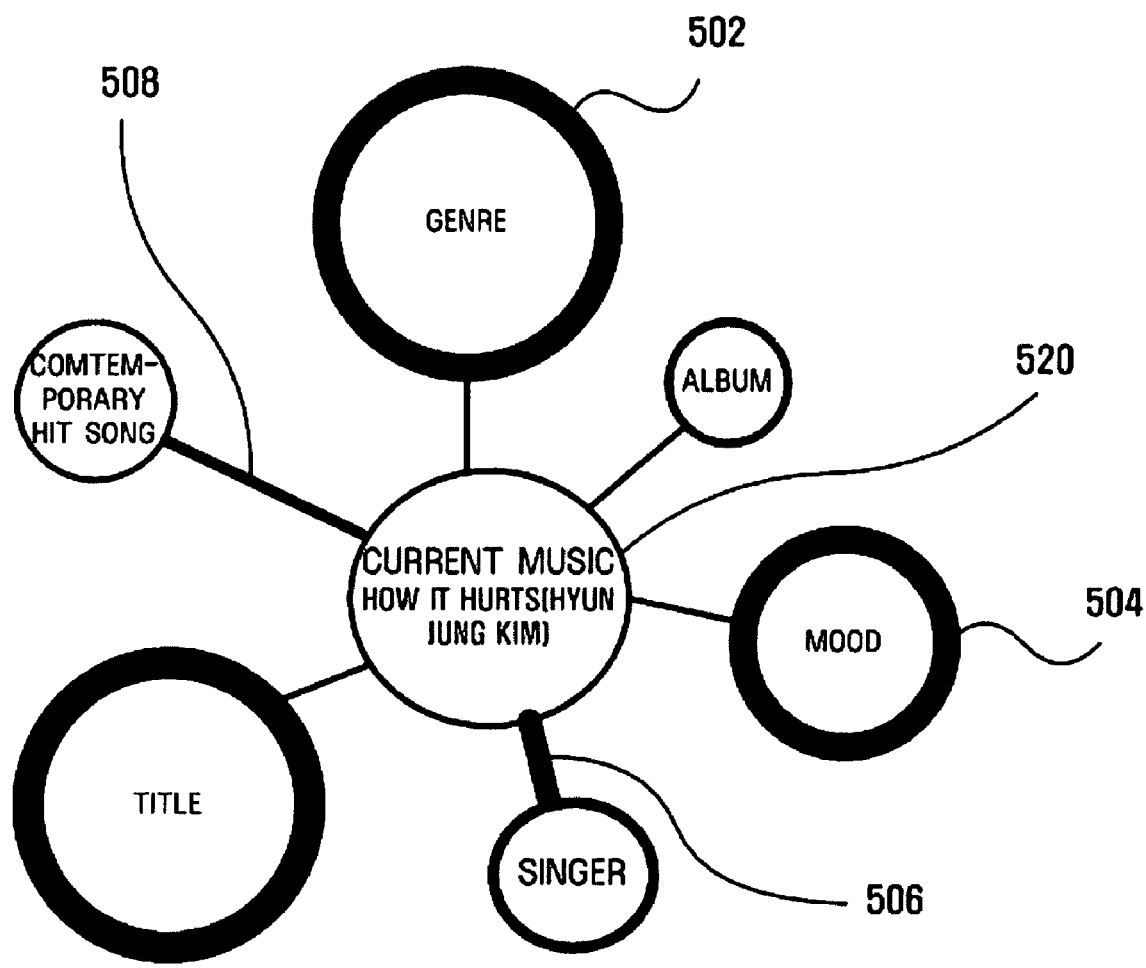
FIG. 5 illustrates a root category generated based on media content currently in use in a dynamic category display device using meta data of media content according to an embodiment of the present invention.

FIG. 5 illustrates a root category generated on the basis of media content currently in use in a dynamic category display device using meta data of media content according to an embodiment of the present invention.

Here, the dynamic category display device may include a category generating unit and an output unit for a GUI image, for example.

The category generating unit may include the root category generating unit 206 or the sub-category generating unit 208 shown in FIG. 2. The root category generating unit 206 generates root categories using meta data on the basis of the media content currently in use. If any one of the root categories is selected by the user's input after the root categories are generated, the sub-category generating unit 208 may generate the sub-categories using the meta data of the media content currently in use, on the basis of the selected category. In other words, the sub-category generating unit may generate the sub-categories on the basis of the media content currently in use or the selected category.

The output unit 210 may graphically display various data, and, as an example, may display the data as images. For example, in FIG. 5, the output unit 210 outputs dynamic categories in an example of media content corresponding to music. The output unit 210 displays the root categories generated by the meta data of corresponding music on the basis of the song currently in use. If a category is displayed with a large size, relative to the other categories, such as categories 502 and 504, for example, it may alert the user that a large number of songs exist within the categories. If link edges are displayed as darker with respect to other categories, such as link edges 506 and 508 for example, it may indicate favorite categories, i.e., categories that the user frequently selects. Further, the number of songs within corresponding categories may be displayed in accordance with the thickness of edge lines of the categories. The number of songs belonging to a corresponding category can be obtained by browsing the meta data. The number of times the individual user has browsed a particular category can be obtained by updating additional meta data, or the number of times all users have browsed a particular category may be obtained by updating additional meta data through wired or wireless networks. As shown in FIG. 5, a node and the GUI displayed by the link edges are shown as an example. If the number of songs belonging to a particular category is large, the category may be listed first in the menu, or differentiated by color. For example, the GUI of the output unit in FIG. 5 displays, using meta data of the song 520 titled "how it hurts" currently in use, that there are a relatively large numbers of songs corresponding to title, genre, and mood, which are related to the current song, and that the user relatively frequently selects the category corresponding to singer and hit song on the basis of the current song.

If the user selects the root category, the output unit 210 may display the sub-categories graphically or with images on the basis of the selected root category. In this way, the user may browse desired media content referring the meta data of the media content and easily recognize a browsing frequency or the quantity of the multimedia content for each category visually classified on the basis of the media content currently in use, for example.

Figure 6:
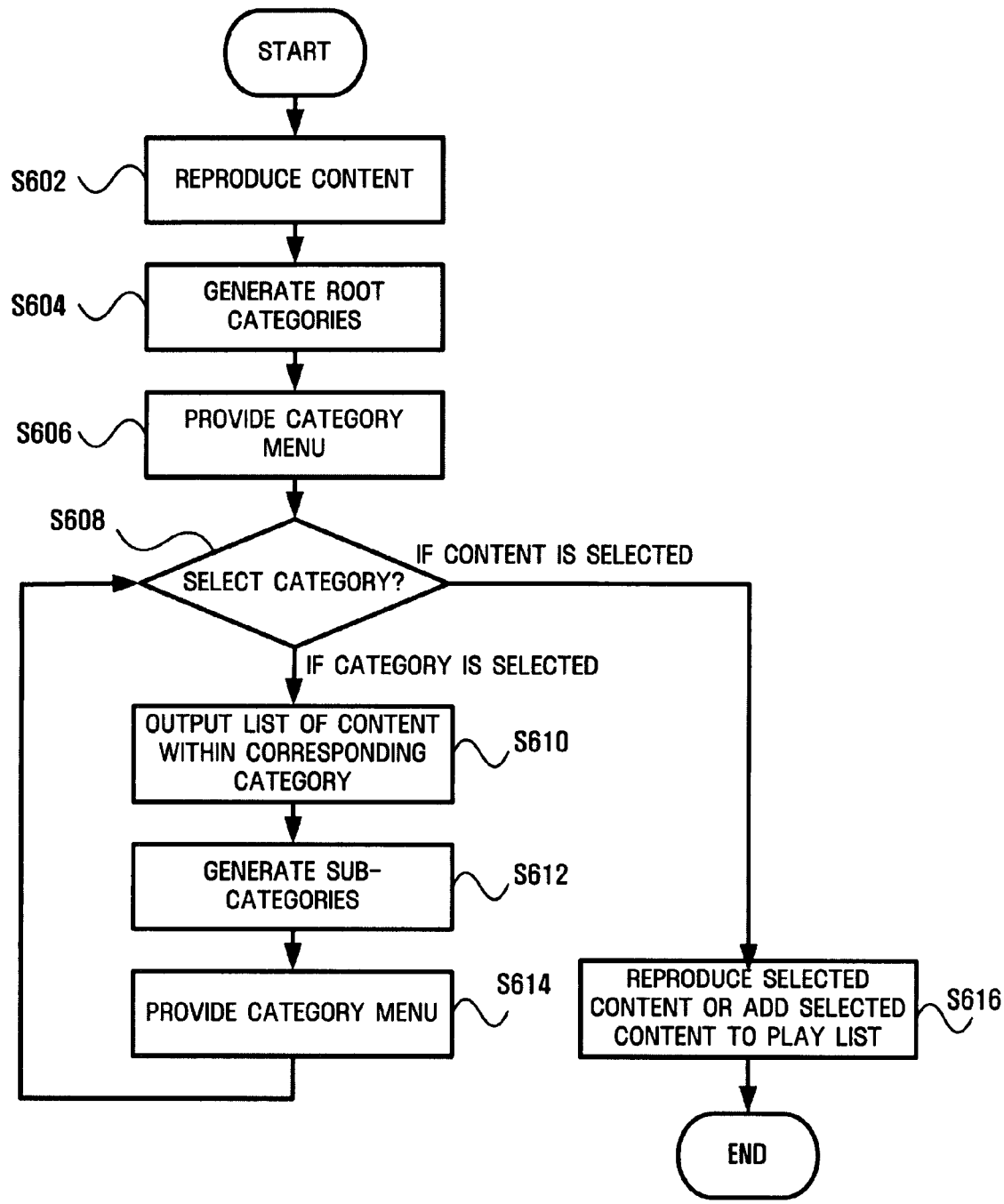
FIG. 6 illustrates a method of browsing media content using meta data according to an embodiment of the present invention.

FIG. 6 illustrates a method of browsing media content using meta data according to an embodiment of the present invention.

First, the media content may be reproduced by the media reproducing unit, in operation S602, for example. The media content currently in use may be executed either randomly by the user or by the user's selection, from the browsing list, of the media content. After the media content is reproduced in operation S602, the root categories may be generated in accordance with the meta data of the media content, in operation S604. Then, the user may select any one of the root categories, in operation S608, and sub-categories included in the selected category may be generated on the basis of the meta data of the media content currently in use, in operation S612, for example. However, if the user selects the media content in the browsing list after the root categories are generated, the media content may be played or included in the user's play list, in operation S616. If the user selects the category, the list of the media content belonging to the selected category may additionally be output and displayed, as in operation S610, for example.

If the sub-categories are generated, they may be listed on the basis of the root category selected by the user, for example. The user may select any one of the sub-categories from the corresponding category to generate sub-sub-categories on the basis of the meta data of the media content currently in use. In this way, the first to N-th sub-sub-categories may be generated, as an example. However, if there are no potential sub-sub-categories remaining, or if there is no media content belonging to the category, the sub-sub-categories need no longer be generated. Further, if the user selects a particular media content from the media content list within the selected category, even though there are additional sub-categories remaining, the selected media content is reproduced or stored in the play list, and the media content browsing is ended.

In an example, the media content takes the form of music files and the song currently in use is the song titled "how it hurts," by Hyunjung KIM. Here, if the song is reproduced, the root categories are generated from the meta data of the song. Examples of the root categories may include genre, title, mood, remake version, singer, and contemporary age. Afterwards, if the user selects any one of the root categories, the sub-categories may be generated in accordance with the meta data of the current music within the range of the selected category corresponding to the current song. Accordingly, the user may select desired music referring to the list of the content belonging to the selected category, or may select any one of the sub-categories for detailed browsing. As described above, the method of generating related categories on the basis of the meta data of the media content currently in use may be repeated to allow the user to effectively browse desired media content.

In FIG. 6, an operation for providing a category menu may also be implemented with a method for browsing media content using meta data, according to an embodiment of the present invention.

Here, the method of browsing media content using a variable menu may include the operations described in the aforementioned method of browsing media content using meta data, i.e., executing content S602, generating the root categories S604, and generating the sub-categories S612, for example. The method of browsing media content using a variable menu may further include providing a root category menu, as in operation S606 and providing a sub-category menu, as in operation S614. Since the categories (i.e., the root categories and the sub-categories) generated when the media content is browsed are variable, menus corresponding to the respective categories may be provided.

In an example, as shown in FIG. 6, the media content takes the form of music. The root categories may be generated based on the meta data of the music file currently in use in operation S604, and the menu may be provided to select any one of the generated root categories in operation S606. In other words, the root category menu may be displayed to allow the user to select a variably generated root category using the input unit. If the root category is selected by the user, the sub-categories may be generated based on the meta data of the music file currently in use within the range of the selected category, in operation S612. The sub-category menu may be displayed to allow the user to select any one of the generated sub-categories, in operation S614, for example.

Since the generated categories are variable, the generated root categories may be varied if a different kind of music is currently in use. Even when the same kind of music is currently in use, the generated root categories may be varied in accordance with an update of the meta data, or the method of selecting the meta data. Thus, the menu that can be selected by the user is variable, as the generated root categories are variable. Likewise, since the sub-categories depend on the root categories and the meta data of the current song, they are also variably generated. Since the above operations may repeatedly be provided for the first to N-th sub-categories, the first to N-th variable menus may be provided to the user.

Figure 7:
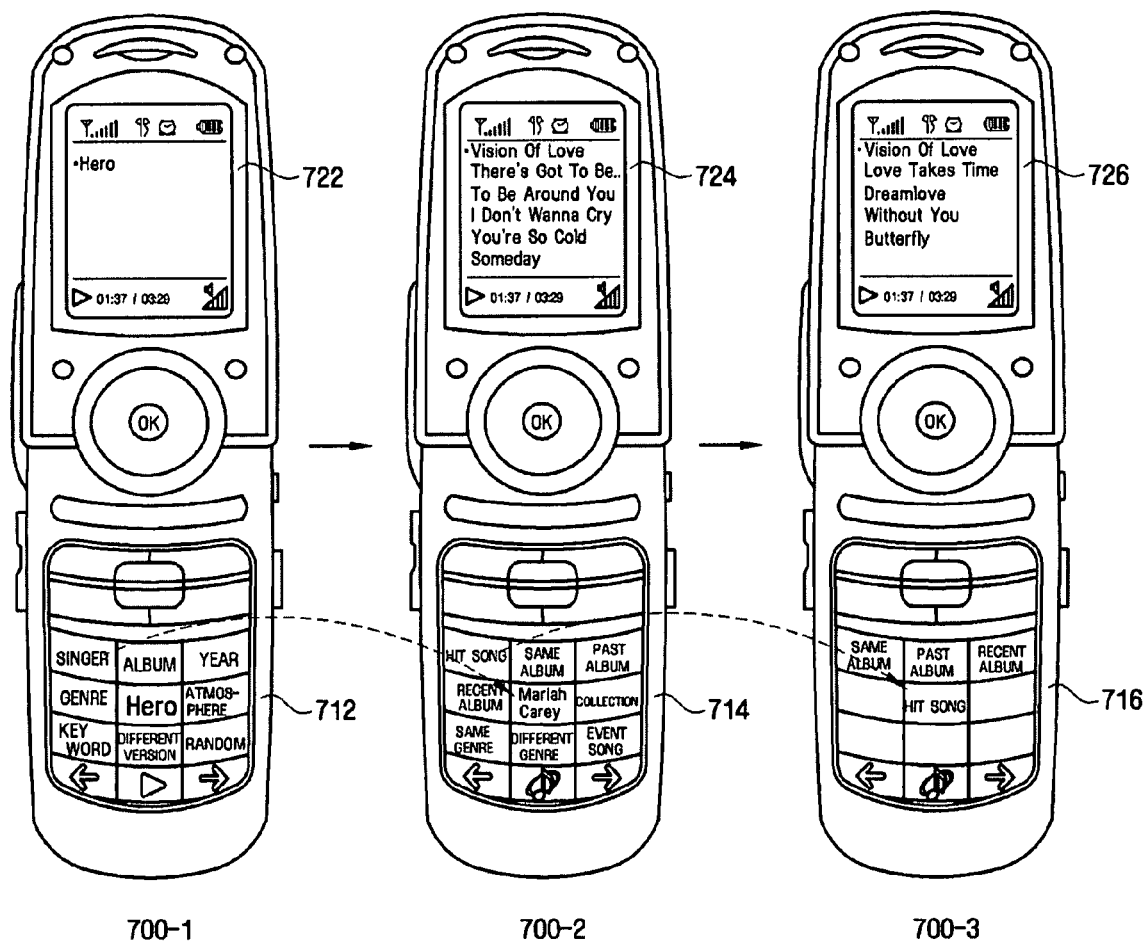
FIG. 7 illustrates a procedure of providing a variable menu from an MP3 player built in a cellular phone, which uses a method of browsing media content using meta data according to an embodiment of the present invention.

FIG. 7 illustrates operations for providing a variable menu from an MP3 player built in a cellular phone, which may use a method of browsing media content using meta data according to an embodiment of the present invention.

In an embodiment, the variable menu is suggested as an example and will be described using the MP3 player of a cellular phone. As shown in FIG. 7, as an example, the current song may be the song "Hero" 722. The user desires to browse and listen to a hit song of the singer who performs the song. The root category 712 may be generated by reading out the meta data of the song "Hero" currently in use. The root category menu may be displayed to allow the user to view the generated root category. For example, the menu may properly be arranged through a number key input unit 712 of the cellular phone. In FIG. 7, the title of the song "Hero" currently in use is arranged on the center of the number key input unit and the root category is arranged on each number key around the center 712, although other arrangements may equally be used. Accordingly, the user may select one category referring to the root category menu corresponding to the number key.

Continuing the example, in FIG. 7, the user selects the root category "singer." A list 724 of other songs by the singer (in this example, Mariah Carey) who sings "Hero" is displayed on the screen of the cellular phone as the user selects the root category "singer." Also, a sub-category 714 is generated on the basis of the meta data of the current song "Hero" within the range of the root category (in this case, singer). For example, the sub-categories, such as hit song, same album, past album, recent album, collection, same genre, different genre, and event, may be generated. The sub-categories may be arranged around the number key input unit on the basis of the singer (Mariah Carey), as an example, as shown in FIG. 7. Accordingly, the user can selectively input a desired sub-category (for example, hit song) to the number key input unit. After the user selects the sub-category "hit song," hit songs of the singer (Mariah Carey) who sings "Hero" are displayed on the screen of the cellular phone 726. A lower category may be generated within the range of the sub-category, i.e., hit song.

As the category is generated as described above, the variable menu may be displayed to allow the user to select the generated category. Further, when the sub-category is selected, a new sub-category corresponding to the sub-category may be generated and a new sub-category menu may be displayed to allow the user to select the new sub-category. Thus, the menu that may be selected by the user is variably generated as the category is variably generated. However, as shown in FIG. 7, the variable menu is arranged on the number key input unit, as an example. Depending on embodiment, the variable category may be graphically displayed on the output unit as a touch screen type, or may be input by the number key input unit referring to the menu displayed in the output unit. In addition, the category corresponding to the variable menu may be selected by the user's voice or the user's motion through motion recognition, as another example.

Figure 8:
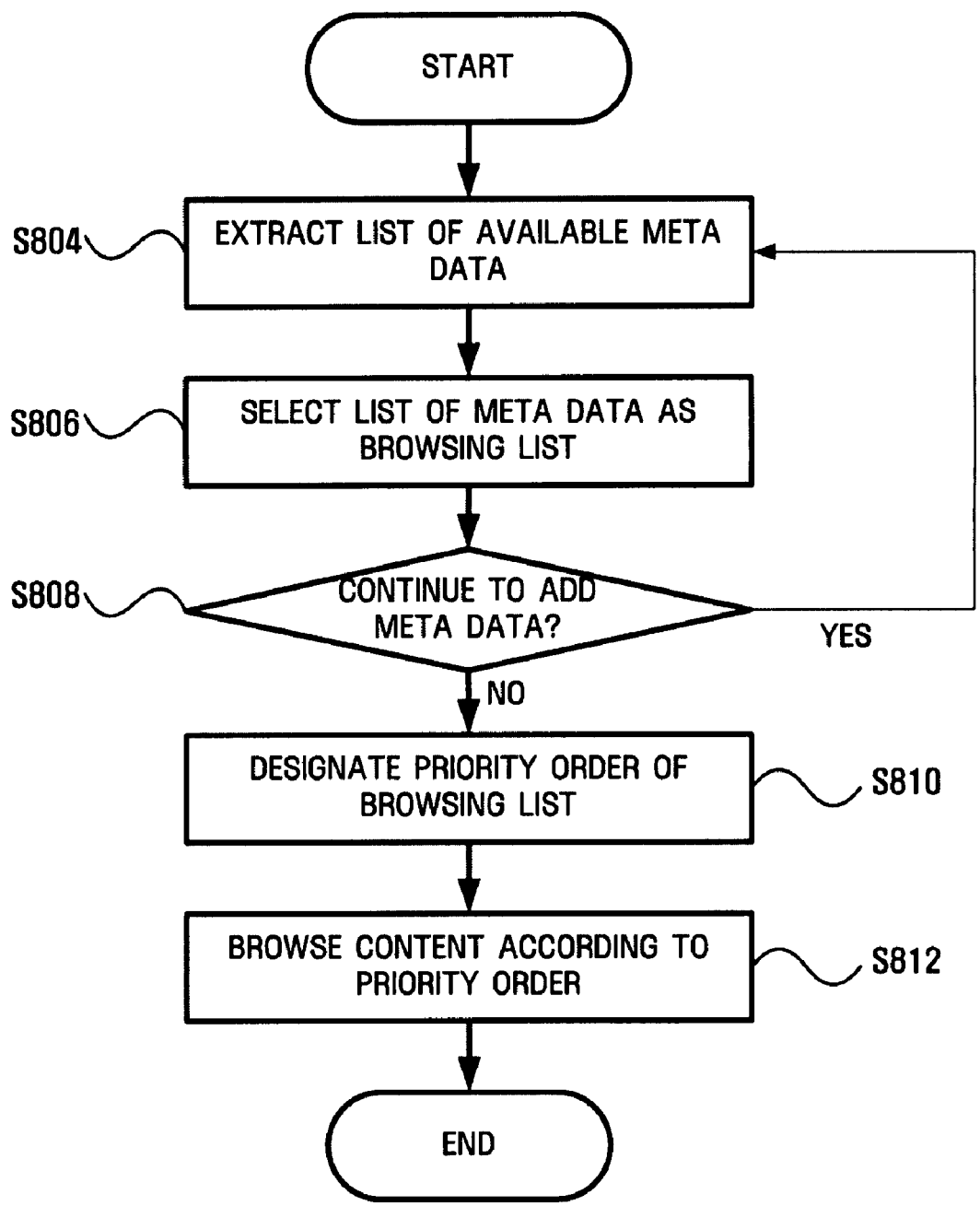
FIG. 8 illustrates a method of browsing media content defined by a user according to an embodiment of the present invention.

FIG. 8 illustrates a method of browsing media content defined by a user according to an embodiment of the present invention.

Various meta data may be added to the media content. If the basic information meta data of the media content and the additional information meta data are added, the browsing list of the media content may be varied depending on the priority order of the meta data or the list of the meta data. The user may also define a browsing method or a browsing path by selecting the meta data and giving the order of the meta data.

As shown in FIG. 8, the user may select the list of meta data for browsing, in operation S806. The basic meta data may be generally the same for the same types of media content while the additional meta data may be different for the same types of media content. Accordingly, all the lists of the meta data that may be extracted are listed to allow the user to select a desired list in operation S806. If the user selects a number of meta data lists for browsing, the priority order for each selected browsing list is designated, in operation S810. If the browsing list and the priority order are designated, the user may browse the media content using the meta data as the priority order designated in accordance with the media content currently in use, in operation S812.

If the media content is browsed according to the user's definition as above, the user may additionally output the browsing result. As a result of browsing, if a large quantity of media content is output, the user may additionally select the list of media content.

In the example described in FIG. 8, the media content corresponds to music, although other types of media content may be accommodated. If the user sets three lists of meta data such as singer, hit song and genre, the browsing method may be executed as follows, as only an example. If the user sets the priority order in the order of genre, singer and hit song, the genre corresponding to the current song is recognized, and songs belonging to the genre are displayed on the screen of the output unit. In addition, singers of the genre are listed to allow the user to select one or more displayed singers. If hit song is used for browsing based on the user's definition, the hit song of the selected singer of the corresponding genre may be listed as the browsing list, for example.

Figure 9:
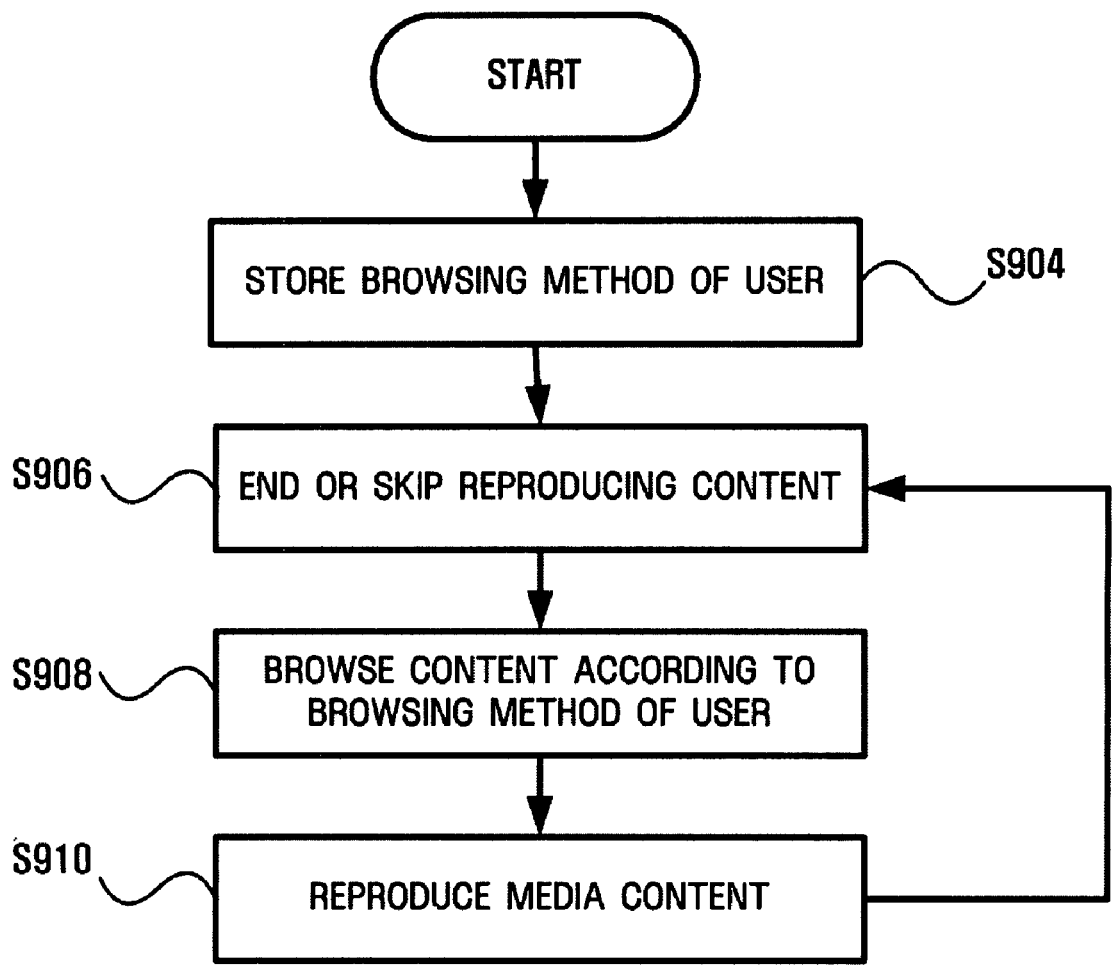
FIG. 9 illustrates a method of successively browsing media content using meta data according to an embodiment of the present invention.

FIG. 9 illustrates a method of successively browsing media content using meta data according to an embodiment of the present invention.

First, the user stores a browsing method, in operation S904. As an example, a browsing method used when the user selects the media content currently in use or a browsing method frequently used while the user browses the media content may be stored. When reproduction of the media content currently in use has ended or a skip function is selected by the user, subsequent media content may be browsed by the stored browsing method, in operation S908. The highly related media content from the browsing list, or the media content randomly selected from the browsing list may be reproduced. Further, as a result of browsing, if a quantity of media content is output, the user may additionally select the media content from a number of browsing lists.

For example, if the user listens to the song "Hero," the method of successively browsing and reproducing media content may be executed, as an example, as follows. Suppose the user listens to the song "Someday" by the singer, Mariah Carey before selecting the song "Hero." The user selects the root category, i.e., singer, to browse next song, and selects hit song from the sub-categories, whereby the user browses and reproduces the song "Hero." Accordingly, if the current song has ended or if the user wishes to listen to the next song, the category selected by the user is stored to give the priority order when the user browses the song "Hero." For example, if the song titled "Hero" is being reproduced, the singer, Mariah Carey, and the list of her hit songs are displayed. Accordingly, the user may select a desired song from the list of hit songs, or may select the first song (the highly related song) from the hit songs of the singer Mariah Carey, or any one of the hit songs, whereby the song may automatically be reproduced.

In the one or more embodiments of the present invention, the term "unit", that is, "module" or "table", as potentially used herein, may refer to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

In addition to this discussion, embodiments of the present invention may also be implemented through computer readable code/instructions in/on a medium, e.g., a computer readable medium, to control at least one processing element to implement any above described embodiment. The medium may correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only a example, the processing element could include a processor or a computer processor, and processing elements may be distributed and/or included in a single device.

As described above, the system, method and medium for browsing media content using meta data in accordance with the present invention has the following advantages.

First, media content related to media content currently in use may easily be browsed by using the meta data of the media content currently in use.

Second, the user may quickly browse desired media content by generating dynamic categories using additional meta data as well as basic meta data.

Third, since the user selects the list of the meta data for browsing and gives the priority order to the meta data, an individual browsing method or path of the media content may be provided.

Finally, because the browsing method using the meta data is used to browse subsequent media content, it is possible to successively browse and reproduce the media content.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system for browsing media content using meta data, the system comprising a processor having the following computer executable components:
   a media reproducing unit to reproduce media content stored in the system and having corresponding meta data;
   a root category generating unit to generate and display at least one root category from the meta data corresponding to the media content currently being reproduced from the system; and
   a sub-category generating unit, controlled by the processor, to generate and display at least one sub-category of a root category when the root category is selected by a user from among the at least one root category based on the meta data corresponding to the media content currently being played back, and wherein the at least one sub-category is different than the at least one root category being displayed,
   wherein the media reproducing unit reproduces media content corresponding to a subcategory of the at least one sub-category upon receiving a user selection of the sub-category,
   wherein the system is a portable digital device.

2. The system of claim 1, wherein the sub-category generating unit repeatedly generates the at least one sub-category of the root category selected by the user based on the meta data until browsing of the media content is ended.

3. The system of claim 2, wherein the media content comprises music files.

4. The system of claim 3, further comprising an output unit to display a list of the media content included in at least one of the at least one sub-category generated by the subcategory generating unit and the at least one root-category generated by the root category generating unit.

5. The system of claim 3, wherein the meta data comprises basic meta data and additional meta data, and the additional meta data comprises related information meta data and related community information meta data.

6. The system of claim 5, wherein the meta data is updated by wired or wireless communication.

7. The system of claim 3 wherein the output unit displays at least one of the at least one root category and the at least one sub-category with an emphasis to indicate that a large quantity of media content is included in at least one of the root category and the subcategory.

8. The system of claim 1, wherein a relative quantity of media content belonging to the categories is indicated by a size or color of a node in a displayed image.

9. The system of claim 1, wherein a relative number of times the user has browsed the categories is indicated by a thickness of link edges in a displayed image of the category.

10. The system of claim 1, wherein the sub-category generating unit is configured to further display a sub-sub-category of the sub-category when the sub-category is selected by the user from among the at least one sub-categories based on the meta data corresponding to the media content currently being played back.

11. A method of browsing media content using meta data implemented by a media content browsing system including a processor having processor executable instructions, the method comprising:
   reproducing media content stored in the system and having corresponding meta data;
   generating and displaying at least one root category based on the meta data corresponding to the media content currently being reproduced from the system;
   generating and displaying, by way of the processor, at least one sub-category of a root category when the root category is selected by a user from among the at least one root category based on the meta data corresponding to the media content currently being played back, and wherein the at least one sub-category is different than the at least one root category being displayed; and
   reproducing media content corresponding to a sub-category of the at least one subcategory upon receiving a user selection of the sub-category,
   wherein the system is a portable digital device.

12. The method of claim 11, wherein the generating of the at least one sub-category comprises repeatedly generating the at least one sub-category of the root category selected by the user based on the meta data until browsing of the media content is ended.

13. The method of claim 11, wherein the media content comprises music files.

14. The method of claim 13, further comprising displaying a list of the media content included in at least one of the at least one generated root category and the at least one generated sub-category.

15. The method of claim 13, wherein the generating of the at least one root category and the generating of the at least one sub-category, each further comprise providing a menu allowing the user to select the generated categories.

16. The method of claim 15, wherein the providing of the menu comprises displaying the generated categories through an output unit.

17. The method of claim 15, wherein the providing of the menu comprises displaying the generated categories using a key pad or touch pad of an input unit corresponding to the generated categories.

18. The method of claim 13, wherein the meta data comprises basic meta data and additional meta data, and the additional meta data comprises related information meta data and related community information meta data.

19. The method of claim 14, wherein the displaying further comprises displaying at least one of the at least one root category and the at least one sub-category with an emphasis to indicate that a large quantity of media content is included in at least one of the root category and the sub-category.

20. The method of claim 13, further comprising updating the meta data by wire or wireless communication.

21. At least one non-transitory medium comprising computer readable code to control at least one processing element to implement the method of claim 11.

22. The method of claim 11, further comprising displaying a sub-sub-category of the sub-category when the sub-category is selected by the user from among the at least one sub-categories based on the meta data corresponding to the media content currently being played back.

* * * * *